H. T. PREBLE.
AUTO TRACTOR.
APPLICATION FILED NOV. 13, 1912.
1,097,044.
Patented May 19, 1914.
2 SHEETS—SHEET 2.
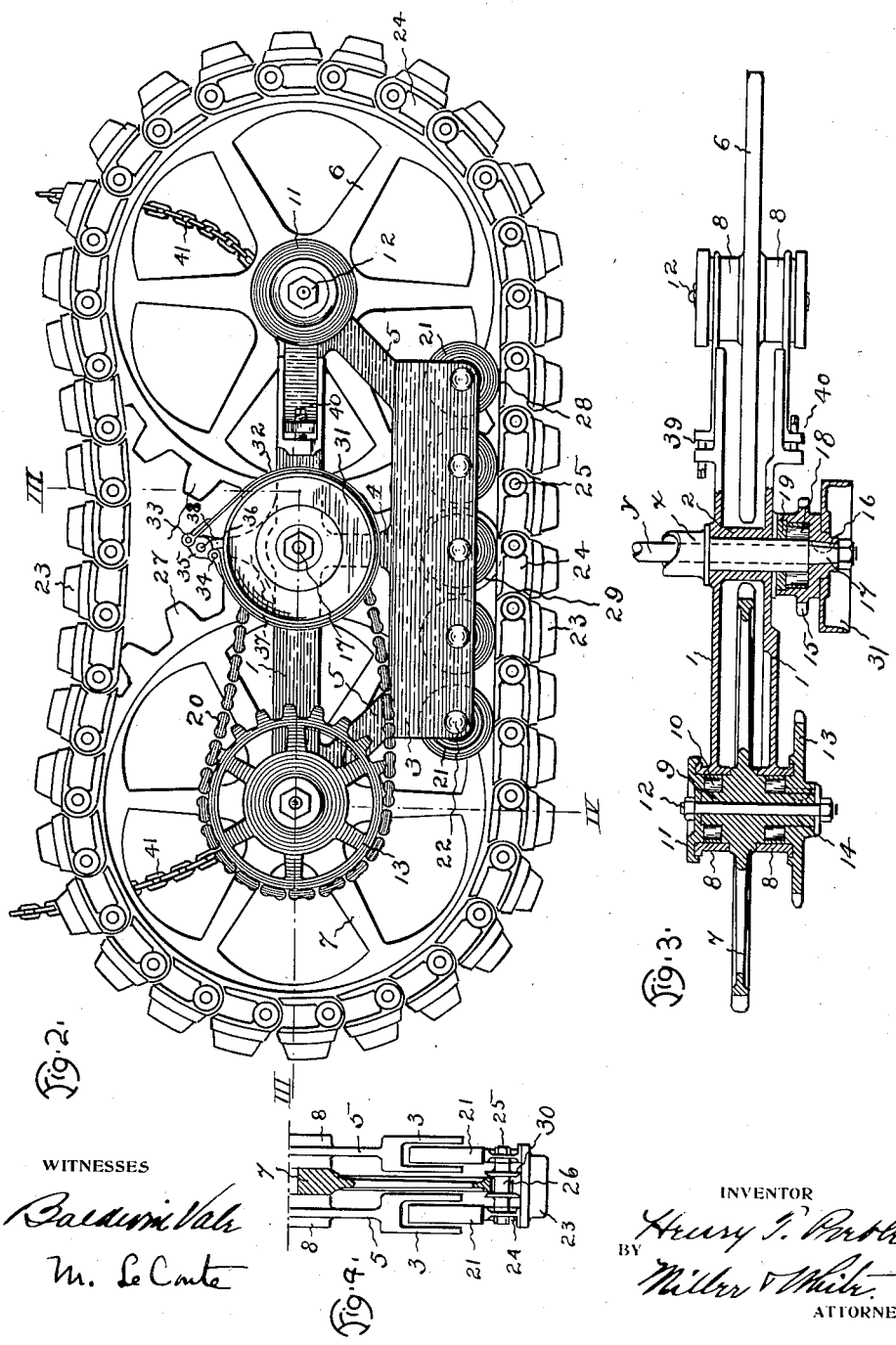

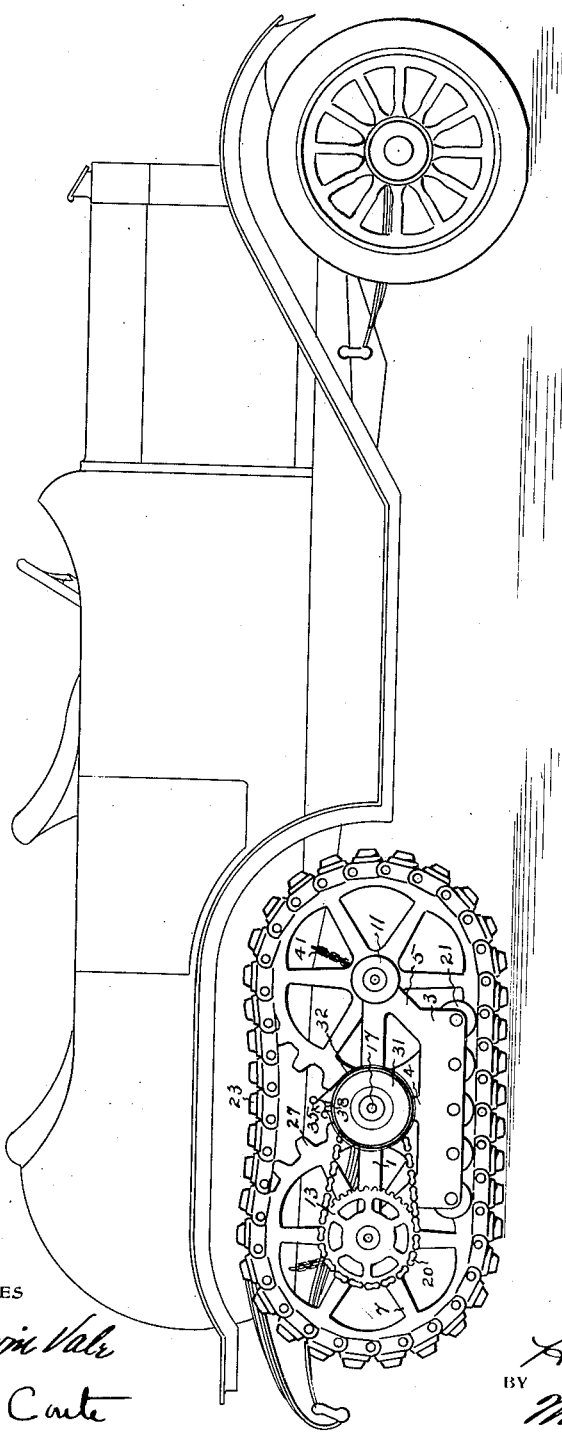

UNITED STATES PATENT OFFICE.

HENRY T. PREBLE, OF BERKELEY, CALIFORNIA.

AUTOTRACTOR.

1,097,044. Specification of Letters Patent. Patented May 19, 1914.

Application filed November 13, 1912. Serial No. 731,105.

*To all whom it may concern:*

Be it known that I, HENRY T. PREBLE, a citizen of the United States, and a resident of Berkeley, county of Alameda, State of California, have invented new and useful Improvements in Autotractors, of which the following is a specification.

This invention relates to improvements in autotractors and more particularly to the traction mechanism thereof.

The object of the invention is to provide a traction belt mechanism adapted to be substituted for the concentric wheels on light vehicles of relatively high speed, to extend their use to sandy or marshy wastes where the concentric wheel equipment is inadequate.

Broadly stated the invention consists of a supporting truck pivoted upon the supporting axle of an automobile. Traction sprockets are journaled in opposite ends of the truck. An endless traction belt completely surrounds the truck and engages the traction sprockets. The internal surface of this belt is provided with traction surfaces or tracks interjoined to present a continuous plane or runway. Traction rollers are journaled in the truck on opposite sides of the driving sprockets, and roll upon these tracks. The weight of the vehicle through the supporting axle, the supporting truck pivoted thereon, and the traction rollers journaled in the truck is transmitted to that portion of the traction belt resting upon the ground. Progression is accomplished by pushing the traction truck forward over the ground portion of the belt. This is effected by rotating the rear traction sprocket. The driving mechanism consists of a driven sprocket fixed to the rear traction sprocket and actuated by a sprocket chain engaging a driving sprocket fixed upon the driving axle of the tractor and geared to the prime mover.

While illustrating and describing this invention in its preferred form and application, I do not intend to sacrifice any statutory rights that entitle me to the broadest interpretation of my invention. Modifications in the construction and arrangement of the parts will suggest themselves to those skilled in this art in adapting it to conditions not comprehended in the particular disclosure in the drawings or the following specific description.

In the drawings: Figure 1 is a side elevation of a traction mechanism constructed in accordance with this invention and applied to a conventional automobile. Fig. 2 is an enlarged detail in side elevation of the traction mechanism. Fig. 3 is a plan view from above of the same partially in horizontal cross section on the line III—III. Fig. 4 is a fragmentary detail of the same in end elevation partially in vertical cross section.

In detail the construction consists of the supporting truck comprising two side frames composed of the horizontal beams 1—1 joined by the hollow strut 2 preferably cast integral with the side frames. The traction roller mountings comprise the archway composed of the side plates 3—3 joined to the beams 1 by the pillars 4—4 at the center and by the angular extensions 5—5 from the ends of the archways to the ends of the beams 1. The strut 2 acts as an axial hub pivot encircling the supporting axle $x$ of the auto "chassis." In automobile practice this axle is supported by the wheels which are driven by the "floating" axles $y$ geared to the prime mover and fixed to the hubs of the wheels. No change is made in this rear axle construction in the application of this invention to this type of vehicle.

The traction sprockets 6 and 7 are journaled in the end of the trucks between the bearings 8. The hubs of the sprockets are turned down to form the stub journals 9 to receive the anti-friction roller bearings 10, that are held in place by the end caps 11 secured by the bolt 12 extending through the sprocket hubs. The traction sprocket 7 is driven by the driven sprocket 13 fixed upon the extended stub journal 14 by keying or otherwise.

The driving sprocket 15 is in alinement with the driven sprocket and is fixed by the key 16 to the tapered end 17 of the floating axle $y$, geared through the differential gear set to the prime mover. The hub of this sprocket is hollowed to receive the anti-friction roller bearing 18 interposed between the supporting axle $x$ and the sprocket. The roller bearing is held in position by the ring 19 screwed into the hub of the sprocket and surrounding the floating axle. By this arrangement the pull of the sprocket is transferred from the floating to the fixed supporting axle. The driving sprocket operates through the encircling sprocket chain 20 to drive the sprocket 13.

The traction rollers 21 are journaled on the gudgeon pins 22 extending between the sides 3 of the archways on the truck frames. The traction belt is composed of a series of articulated link sections. Each section is provided with an inserted rubber block 23 or a resilient substitute for road contact. The side lapping ends of the links 24 are joined by the pintle bolts 25 passing through the ends of the links. Each bolt is provided with a flanged roller 26 extending across the space between the link sides and free to revolve on the bolt. The sprocket teeth 27 on the traction sprockets 6 and 7 engage these rollers 26. The sprocket 7 causes the traction belt to travel around the sprockets, encircling the whole truck in its orbit. The traction rollers 21 bear upon the rail heads 28 formed upon the link sides 24. The traction belt always remains stationary with respect to the traction rollers and the ground. The driven traction sprocket 7 merely lifts up each section of the traction belt seriatim. Progress is the result of the climbing or rolling action of the traction sprocket engaging the stationary ground portion of the traction belt. The traction rollers support the weight resting upon the truck, and roll freely upon the rail heads 28 arranged in breakjoint relation to preserve the plane of the runway. The center rollers may be provided with the flanges 29 to preserve the alinement of the track.

The track rail heads 28 are fixed near the outer edges of the traction sections to give greater support and to allow the series of rollers to be extended on each side of the traction sprockets, 6 and 7 beyond the circumference thereof. In this manner the maximum ground bearing is attained with the minimum length of traction belt, with obvious attendant advantages. The flanges 30 on the rollers 26 coöperate with the sides of the sprocket teeth on the traction sprockets to center the traction belt and prevent side slip of the engagement of the belt with the sprockets from lateral strains on side hill or other unusual causes.

The brake mechanism consists of the drum 31 fixed on the sprocket 15 attached to the driving axle. This drum is acted upon by the contraction band 32 pivoted at 33 and 34, on the bracket 35 fixed upon the shaft 36 journaled on the bracket 37 formed on the truck frame. The shaft 36 is oscillated to contract the band on the drum by the arm 38 fixed thereon and linked to the brake lever of the vehicle. The brakes have a twofold function, viz.: to arrest progress by friction and to lock one side of the differential gearing to facilitate turning. When one of the brakes is set, the effect of the differential gear is to divert all the power to the other traction mechanism causing it to swing around the stationary traction mechanism.

The difficulty of steering an automobile in deep sand by the sole means of the pilot wheels is sufficiently well known.

Means are provided at 39 and 40 for taking up slack in the traction belt. Variations in the construction of the driving axle equipment of automobiles demand consistent modifications in the manner of attaching this invention thereto. Standardization has reduced these modifications to mere changes of mechanical details well within the spirit of this invention. Excessive vertical oscillation of the truck is limited by the stay chains 41 extending from the truck to the "chassis" frame on both sides of the pivotal center 2. The demand for this attachment to light self propelled vehicles is confined largely to sandy and marshy conditions that the present type of wheeled automobile is unable to negotiate. The traction belt form of tractor is not designed for high speeds, but the present invention accurately constructed of high grade materials, of light weight, provided with rubber traction blocks and attached to a spring mounted "chassis" is capable of making speeds up to twenty miles per hour on yielding ground without injury to itself. The average gear ratio of automobiles gives a possible speed of about forty miles per hour. By back gearing the sprockets 13 and 15 in a ratio of one to two, and preserving the tractive diameters, the speed is reduced one half, other possibilities are apparent.

The operation of an automobile having this invention applied thereto is unaltered so far as the control is concerned. It may progress, reverse and maneuver in the usual manner. The speed is reduced, but the field of operation is extended. The traction belt mechanism can be removed and the usual wheels replaced, with little effort.

Having thus described this invention, what is claimed and desired to be secured by Letters Patent is:

1. A traction belt mechanism comprising fixed axle, a truck pivoted on said fixed axle, traction sprockets journaled in the ends of said truck, a traction belt encircling said truck and engaging said sprockets, traction rollers interposed between said truck and the ground portion of said belt, a driving axle rotatable in said fixed axle, a driving gear fixed upon said driving axle and geared to one of said traction sprockets, and a brake drum fixed upon said driving axle coöperating with a brake band mechanism pivoted on said truck.

2. A traction belt mechanism comprising a truck with a pivotal axis, traction sprockets mounted in the ends of said truck on opposite sides of said axis, an articulated traction belt encircling said truck, traction rollers mounted upon said truck, break joint rail sections formed upon the links of said belt and located near the lateral edges of said traction belt, and a spacing roller mounted upon the pintle pins of the articulations in the belt and having spaced flanges formed near the center thereof on opposite sides of said sprockets.

In testimony whereof I have hereunto set my hand at Stockton county of San Joaquin State of California this 20th day of October 1912.

HENRY T. PREBLE.

In presence of—
 GEORGE E. CRANE,
 BALDWIN VALE,
 M. L. CONTE.